United States Patent [19]
Knapp et al.

[11] Patent Number: 5,213,750
[45] Date of Patent: May 25, 1993

[54] METHOD TO STRAIGHTEN CROSS LINKED POLYETHYLENE HIGH VOLTAGE POWER CABLE

[75] Inventors: Todd K. Knapp, Waukesha; Darren W. Martindill, Racine; Paul M. Rosciczewski, Eagle, all of Wis.

[73] Assignee: Cooper Power Systems, Inc., Houston, Tex.

[21] Appl. No.: 849,259

[22] Filed: Mar. 11, 1992

[51] Int. Cl.⁵ .................. B29C 53/02; B29C 53/16
[52] U.S. Cl. .................. 264/280; 264/285; 264/322; 264/339
[58] Field of Search .............. 264/322, 339, 285, 295, 264/280; 219/535; 425/392, 393, 384, 505; 29/528, 529, 549

[56] References Cited

U.S. PATENT DOCUMENTS

| | | | |
|---|---|---|---|
| 2,697,772 | 12/1954 | Kinghorn . | |
| 3,146,449 | 8/1964 | Serge et al. | 219/209 |
| 3,187,279 | 6/1965 | Hafner | 219/209 |
| 3,305,668 | 2/1967 | Smith | 219/535 |
| 3,649,366 | 3/1972 | Jordan et al. | 219/209 |
| 3,840,349 | 10/1974 | McGhie | 219/385 |
| 4,081,737 | 3/1978 | Miyahara | 219/209 |
| 4,234,624 | 11/1980 | Linderoth et al. | 427/55 |
| 4,436,565 | 3/1984 | Weitzel et al. | 156/49 |
| 4,440,712 | 4/1984 | Imgram | 264/339 |
| 4,457,975 | 7/1984 | Bahder | 264/237 |
| 4,460,820 | 7/1984 | Matsumoto et al. | 219/385 |
| 4,464,565 | 8/1984 | Spangler | 219/535 |
| 4,532,375 | 7/1985 | Weitzel et al. | 174/107 |
| 4,942,287 | 7/1990 | Walker | 219/385 |
| 5,004,574 | 4/1991 | Sandt | 264/339 |
| 5,030,810 | 7/1991 | Haley et al. | 219/385 |

Primary Examiner—Jill L. Heitbrink
Attorney, Agent, or Firm—Ned L. Conley

[57] ABSTRACT

A method for forming cable which is insulated with a rigid insulating layer into a desired shape, comprising the steps of wrapping the a portion of the cable with a heater tape that houses heater elements, causing the elements to become hot and heat the cable portion so that its insulating layer is heated and loses its molecular memory of its prior configuration, and reconfiguring the cable portion into the desired shape.

11 Claims, 1 Drawing Sheet

METHOD TO STRAIGHTEN CROSS LINKED POLYETHYLENE HIGH VOLTAGE POWER CABLE

TECHNICAL FIELD OF THE INVENTION

The present invention relates to methods for straightening power cable which is sheathed in cross-linked polyethylene insulation. More particularly, the present invention discloses a method for heating a portion of the cable to straighten the cable before installation. Still more particularly, the present invention discloses wrapping a flexible heater tape around a cable and heating it to a temperature at which the insulation is malleable.

BACKGROUND OF THE INVENTION

In the field of hydrocarbon polymer products it is well known that the application of heat can result in a softening of the product. Furthermore, if a cross-linked polymer product is produced and then allowed to cool to ambient temperatures in a particular configuration, the molecules of the polymer will bond in such a manner that the product will have a "memory" of that original configuration and will tend to resist being reconfigured. For example, cables sheathed in cross-linked polyethylene insulation that are stored on spools may retain an unwieldy, kinked shape when removed from the spool. The kinking greatly increases the difficulty of measuring a desired length of cable, or of threading the cable through a straight conduit.

Similar problems are encountered in the installation of linoleum and have been solved by application of a heating means to the roll of linoleum. For example, U.S. Pat. No. 4,942,287 discloses a heater assembly comprising a heater tube and a heater blanket for heating a roll of linoleum prior to unrolling the linoleum for installation.

Additionally, various methods for heating tubular members are known. U.S. Pat. No. 3,840,349 discloses a sublimation chamber coaxial with a heater that may be wound around the outside of the sublimation chamber or pass through its center. In both embodiments the heater and chamber are relatively rotatable, generally by fixing one and rotating the other.

U.S. Pat. No. 2,697,772 discloses a method for fusing a longitudinal seam in an aluminum cable sheathing by passing the cable wrapped in sheathing through a coiled induction heater. Alternating current passed through the coil causes a voltage difference across the seam, inducing current across the seam when the seam edges are brought together and forming a weld. The induction coil is fixed relative to the cable and forms part of a manufacturing process.

U.S. Pat. No. 4,234,624 discloses a method for applying an insulation of cross-linked polyethylene on a cable conductor wherein cross-linked polymer is extruded around the cable and then heated with radiation energy while the cable is subjected to pressure within a vulcanization tube. The radiation is generated using infrared radiation sources outside the tube, with temperatures exceeding 1100° C.

U.S. Pat. No. 4,460,820 discloses an apparatus for heating a heat shrinkable tube. The apparatus provides a plurality of independently operable heating units supported on a base.

U.S. Pat. No. 3,187,279 discloses a heating means for surface wave conductors which comprises a conducting spiral wound around the surface wave conductor.

U.S. Pat. No. 3,187,279 discloses a particular winding designed to avoid affecting surface wave propagation within the surface wave conductor.

Watlow Electric Heaters and Control, St. Louis, Mo. manufactures a flexible heater that comes in blanket or tape form. Watlow recommends use of the flexible heater in heating polyvinyl chloride conduit or tubing to simplify bending it to the desired shape in the field.

None of the prior art discloses the use of an inexpensive, simple, portable heating apparatus for heating variously sized polyethylene insulated cables in the field. The present invention discloses the use of a flexible heat tape designed to be wrapped in a spiral around a cable and designed to heat the cable insulation to a temperature at which it is malleable in a relatively short time.

SUMMARY OF THE INVENTION

The present invention involves the use of a heatable tape to heat a portion of a cable that is insulated with an insulating layer that is rigid at ambient temperatures. The invention enables the user to heat that portion of the insulation to a temperature sufficient to cause the molecules in the insulation to lose their memory of a prior configuration, thereby making handling of that portion of the cable significantly easier. The heatable tape houses a plurality of heater elements, which may be connected to a power source to generate heat.

DETAILED DESCRIPTION OF THE INVENTION

The present invention involves the use of a heater tape that is designed for application in the field to apply heat to power cables sheathed in cross-linked polyethylene insulation that is rigid at field temperatures. The tape is flexible and of a width and length such that it may be coiled around a desired portion of the cable to heat that portion of the cable to a temperature at which the insulation becomes malleable. The tape comprises a flexible heatable material housing one or more power leads that provide resistance heating to the cable.

Figure 1:
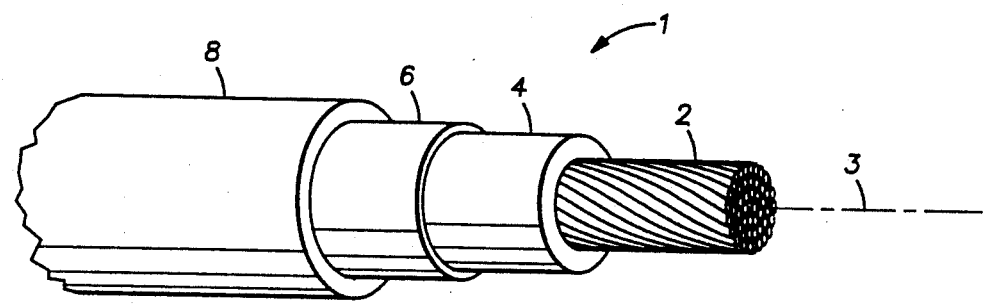
FIG. 1 is an expanded view of an insulated cable.

As seen in FIG. 1, the cable which is heated according to the method of the present invention consists of several layers. Cable 1 is shown, having longitudinal axis 3. Core 2 of cable 1 is typically a conductor, which is insulated with a relatively thick layer of insulation 4. Insulation 4 is typically a polymerized hydrocarbon, such as cross-linked polyethylene. Outside of this insulating layer may be one or more additional layers, such as copper shield layer 6 and jacket layer 8 shown in FIG. 1. The outer diameter of the cable will vary with the thicknesses of the various layers. An example of cable to which the present tape could be applied is Okoguard 69 kV Shielded Power Cable, Catalog Number 135-22-3678, which has an outer diameter of 3.30 inches. At temperatures above approximately 50° C., the cable is sufficiently flexible to be easily bent into the necessary shapes for installation. At ambient temperatures, however, the polymer layer of the cable is rigid and resists efforts to bend the cable into a desired shape.

Hence, it is desirable to heat a portion of the cable to facilitate measuring and handling thereof.

Figure 2:
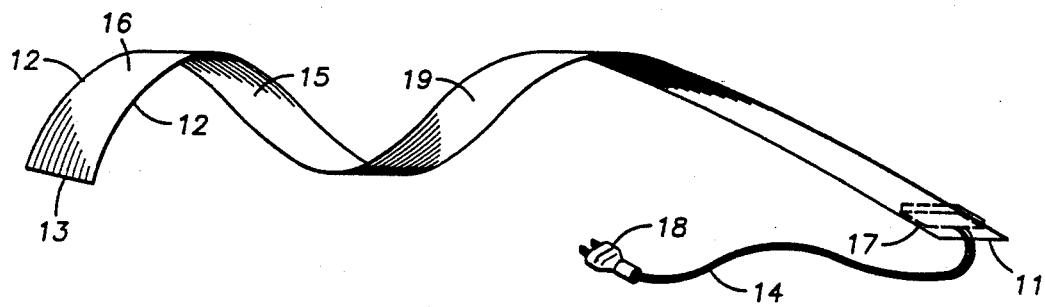
FIG. 2 shows a heater tape in loose form.

Turning now to FIG. 2, heater tape 10 is shown in its entirety, as it appears before being wound onto a cable. Tape 10 has a lead end and a remote end 13. Since the tape is substantially flat, it has an outer surface 16 and an inner surface 15, and two edges 12. Embedded in or adhered to the tape material 19 is a heater element or elements (not shown), which are preferably resistance heaters. The heater element or elements extend along the length of tape 10 and are connected to a thermostat 17 at the lead end From the thermostat, two electrical leads 14 extend from the tape and are electrically connected to a standard two-pronged outlet plug 18. Thermostat 17 and outlet 18 are in series. The number of heater elements and leads 14 may be any reasonable number.

Tape 10 is constructed of any flexible material that is capable of being heated to the desired temperature, and is preferably silicon rubber. Thermostat 17 is preferably affixed to the tape's outer surface 16, preferably with silicon adhesive, and is preferably thermally insulated so that it senses the temperature of inner surface 15. Tape 10 may have any practical dimensions, and is preferably two inches wide and five feet long. A preferred manufacturer of the tape is Watlow Electric Heaters and Control, St. Louis, Mo. Tape 10 may be stored flat or coiled, and may be precoiled, to make wrapping of the tape onto the cable easier.

Figure 3:
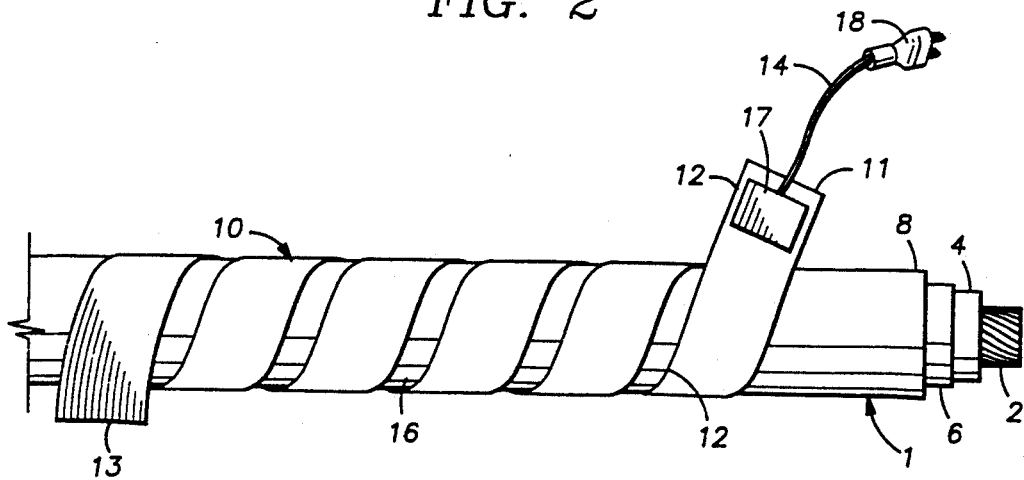
FIG. 3 shows the heater tape wrapped on an insulating cable according to the present invention.

Turning now to FIG. 3, the tape 10 is shown wound on cable 1. Tape 10 is wound in any desired manner, and preferably in a manner which allows efficient heating of the desired portion of cable. Inner surface 15 of tape 10 is in heat conducting contact with jacket 8 of cable 1. The desired length of cable to be heated is typically less than four feet. When the length of cable 1 that is desired to be heated has been wrapped with tape 10, tape 10 is secured on cable 1 with straps (not shown), or other fastening means, which may be affixed to tape 10 and which hold tape 10 in wrapped engagement with cable 1. Outlet plug 18 is connected to a power source, which is preferably a 120 volt AC source, but which may be any power source suitable for resistance heating of the heater elements. The heater elements are heated by the passage of electrical current therethrough until the cable temperature reaches approximately 85° C. 85° C. is the temperature at which the cross-linked polyethylene insulation commonly found on such cables loses its molecular "memory" enough to facilitate measurement and installation of the cable; however, it will be understood that tape 10 can be designed to heat cable to other temperatures, depending on the composition and thickness of the cable's insulating layers. Thermostat 17 is set to sense when tape 10 has reached the desired temperature, and acts as a switch to open the power circuit, thereby avoiding overheating of the tape.

Heat from the heating elements is transferred to the taped portion of cable 10 by a combination of radiation, conduction, and convection, depending on the structure of the tape and how closely the tape contacts the cable. It may be desired to cover the taped portion of the cable with an insulating blanket, to minimize heat loss to the environment.

Once the cable is heated to the preset temperature, which takes approximately fifteen minutes, the tape is removed and the heated portion of the cable is straightened or bent, as desired. The softened polyethylene insulation will be held in the desired shape by the conducting core and will stiffen as it cools. It is possible to repeat the process without negative effects, since each heating erases from the insulation the memory of its previous configuration.

While the invention has been discussed with regard to specific embodiments, it will be understood that it is possible to vary certain parameters, such as the size of the tape, number of heater elements and leads, power source and cable type, without departing from the scope of the invention.

What is claimed is:

1. A method for forming cable having a rigid insulating layer enveloping an electrical conducting core into a desired shape, comprising the steps of:
    wrapping a portion of the cable with a heater tape;
    causing the tape to heat the cable portion, so that the insulating layer of that portion is heated to a temperature at which the insulating layer is malleable; and,
    forming the conducting core and the insulating layer of the portion of the cable into the desired shape.

2. The method according to claim 1 wherein the heater tape is removed from the cable before the forming step.

3. The method according to claim 1 wherein the rigid insulating layer comprises cross-linked polyethylene.

4. The method according to claim 1, further including the step of allowing the cable to cool.

5. The method according to claim 1 wherein the heating step comprises flowing electrical current through leads affixed to the tape to generate heat and transferring the heat to the cable.

6. The method according to claim 5 wherein the heat is generated by the passage of electricity through heater elements affixed to the tape along its length.

7. The method according to claim 6 wherein the heater tape includes a thermostat between the heater elements and a power source.

8. The method according to claim 1 wherein the cable portion is heated to approximately 85° C.

9. The method according to claim 1 wherein the insulating layer has a molecular memory of an original configuration and is heated to a temperature sufficient to allow the insulation to lose its molecular memory, so that the cable portion can be easily reconfigured.

10. A method of forming an electrically conductive cable having an inner core conductive portion and an outer insulative sheath from one geometric configuration to another geometric configuration, comprising the steps of:
    selecting a portion of the cable for forming;
    wrapping a heat generating member over the selected portion of cable;
    generating heat in the heat generating member which is sufficient to increase the temperature of the outer insulative sheath to a level where it loses its elastic memory and can be reformed to a new shape but does not cause the internal core portion to change its elastic properties;
    removing said heat generating source; and,
    forming the portion of the cable into a new shape.

11. A method for straightening an electrically conductive cable that is sheathed in cross-linked polyethylene insulation and that has been stored on a spool, in order to thread the cable through a substantially straight conduit, comprising the steps of:
    selecting a portion of the cable;
    wrapping a heat generating tape around said cable portion;
    generating heat in said heat generating tape so as to heat said cable portion to a temperature at which the insulation loses its shape memory; and
    straightening said cable portion.

* * * * *